(12) United States Patent
Izumino et al.

(10) Patent No.: US 12,459,415 B2
(45) Date of Patent: Nov. 4, 2025

(54) VEHICLE FLOOR CARPET

(71) Applicant: HONDA MOTOR CO., LTD., Tokyo (JP)

(72) Inventors: Yohei Izumino, Tokyo (JP); Takahiro Satoh, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 379 days.

(21) Appl. No.: 18/080,970

(22) Filed: Dec. 14, 2022

(65) Prior Publication Data

US 2023/0191976 A1 Jun. 22, 2023

(30) Foreign Application Priority Data

Dec. 17, 2021 (JP) ................. 2021-205245

(51) Int. Cl.
   *B60N 3/04* (2006.01)

(52) U.S. Cl.
   CPC ............. *B60N 3/048* (2013.01); *B60N 3/042* (2013.01)

(58) Field of Classification Search
   CPC .............................. B60N 3/042; B60N 3/048
   USPC .................................. 296/39.1, 39.2, 97.23
   See application file for complete search history.

(56) References Cited

U.S. PATENT DOCUMENTS

| | | | | |
|---|---|---|---|---|
| 9,022,451 B2* | 5/2015 | Ikeno | ...................... | B60R 21/04 296/75 |
| 9,421,923 B1* | 8/2016 | Singh | .................... | B60R 13/083 |
| 10,960,580 B2* | 3/2021 | Yamagishi | .............. | B60R 13/08 |
| 2007/0080562 A1* | 4/2007 | Taniguchi | ............... | B60R 21/04 296/187.05 |
| 2014/0302285 A1* | 10/2014 | Ikeji | ....................... | B60N 3/042 428/161 |
| 2017/0008462 A1* | 1/2017 | Taniguchi | ............ | G10K 11/168 |
| 2017/0369005 A1 | 12/2017 | Iwata et al. | | |
| 2021/0001762 A1* | 1/2021 | Kamada | ................. | B60N 3/066 |
| 2021/0053511 A1 | 2/2021 | Masumura et al. | | |
| 2022/0234523 A1* | 7/2022 | Ishizaka | ............... | B60R 13/083 |

FOREIGN PATENT DOCUMENTS

| | | |
|---|---|---|
| CN | 1378929 A | 11/2002 |
| CN | 1389362 A | 1/2003 |
| CN | 102756760 A | 10/2012 |

(Continued)

OTHER PUBLICATIONS

Japanese Notice of Opposition received in corresponding Japanese Patent No. 7414793 (Application No. 2021-205245) dated Jul. 31, 2024 (26 pages).

(Continued)

*Primary Examiner* — Jason S Morrow
(74) *Attorney, Agent, or Firm* — Rankin, Hill & Clark LLP (57) ABSTRACT

Provided is a vehicle floor carpet which can suppress the occurrence of bagginess without causing an increase in manufacturing cost and an increase in weight. The vehicle floor carpet includes an insulator including a non-woven sheet, a carpet body disposed on and covers an upper surface of the insulator, and a load-bearing wall which is a compressed portion of the insulator and which extends between a floor panel and the carpet body and supports the floor panel and the carpet body and preserves a space between the floor panel and the carpet body.

6 Claims, 11 Drawing Sheets

(56) References Cited

FOREIGN PATENT DOCUMENTS

| | | |
|---|---|---|
| CN | 106394367 A | 2/2017 |
| CN | 207955425 U | 10/2018 |
| CN | 210852296 U | 6/2020 |
| CN | 112423960 A | 2/2021 |
| DE | 10 2011 120 216 A1 | 5/2012 |
| EP | 2 517 924 A2 | 10/2012 |
| JP | 58-65182 U | 5/1983 |
| JP | 5-272041 A | 10/1993 |
| JP | 5-80744 U | 11/1993 |
| JP | 7-137567 A | 5/1995 |
| JP | H8-108500 A | 4/1996 |
| JP | H10-264706 A | 10/1998 |
| JP | 2000-142200 A | 5/2000 |
| JP | 2006-218987 A | 8/2006 |
| JP | 2013-028246 A | 2/2013 |
| JP | 2013-123920 A | 6/2013 |
| JP | 2016-155461 A | 9/2016 |
| JP | 2018-92160 A | 6/2018 |
| JP | 2020-29217 A | 2/2020 |
| JP | 2021-187210 A | 12/2021 |
| WO | 2019/173747 A2 | 9/2019 |
| WO | 2019186970 A1 | 10/2019 |

OTHER PUBLICATIONS

Japanese Office Action received in corresponding Japanese application No. 2021-205245 dated Aug. 1, 2023 with English translation (6 pages).
Chinese Office Action received in corresponding Chinese application No. 202211484227.9 dated Jul. 24, 2024 with English translation (12 pages).
Chinese Office Action received in corresponding Chinese application No. 202211484227.9 dated Feb. 13, 2025 (7 pages).

* cited by examiner

VEHICLE FLOOR CARPET

CROSS REFERENCE TO RELATED APPLICATIONS

This application claims the foreign priority benefit under 35 U.S.C. § 119 of Japanese patent application No. 2021-205245 filed on Dec. 17, 2021, the disclosure of which is incorporated herein by reference.

BACKGROUND OF THE INVENTION

1. Field of the Invention

The present invention relates to a vehicle floor carpet provided with an insulator.

2. Description of the Related Art

It has long been standard practice to cover a vehicle interior floor surface with a vehicle floor carpet.

For example, a carpet layer constituting a carpet surface and an underlay disposed on a back surface of the carpet layer are integrally formed in a vehicle floor carpet according to JP2013-28246A.

Moreover, the vehicle floor carpet according to JP2013-28246A is configured to provide the underlay with projections corresponding to irregularities on a vehicle interior floor surface so as to flatten a surface of the carper layer by fitting the projections into recesses in the floor surface.

In addition, gaps between the floor surface and the floor carpet are eliminated by filling the recesses in the floor surface, thus getting rid of baggy feeling (bagginess) and loose feeling when feet of a passenger come into contact with the floor carpet.

JP2013-28246A is an example of the related art.

SUMMARY OF THE INVENTION

According to JP2013-28246A, a step of stacking and compressing layers of webs is carried out in order to provide the underlay with the projections.

When the recesses are large, the step of stacking and compressing the webs has to be repeated many times.

As a consequence, the technique disclosed in JP2013-28246A has a problem of causing an increase in operating cost by repeating this step, increases in material cost and weight due to the increase in amount of the web used therein, and so forth.

The present invention has been made in view of the aforementioned issue. An object of the present invention is to provide a vehicle floor carpet which can suppress the occurrence of bagginess without causing an increase in manufacturing cost and an increase in weight.

To attain the object, a vehicle floor carpet according to an aspect of the present invention includes an insulator including a non-woven sheet, a carpet body disposed on and covers an upper surface of the insulator, and a load-bearing wall which is a compressed portion of the insulator and which extends between a floor panel and the carpet body and supports the floor panel and the carpet body and preserves a space between the floor panel and the carpet body.

According to the present invention, it is possible to provide a vehicle floor carpet which can suppress the occurrence of bagginess without causing an increase in manufacturing cost and an increase in weight.

DETAILED DESCRIPTION OF THE EMBODIMENT

A vehicle floor carpet (hereinafter referred to as a floor carpet 1) according to an embodiment of the present invention will be described in detail with reference to FIGS. 1 to 11.

In the following description, the same constituents are denoted by the same reference signs and overlapping explanations thereof will be omitted.

Moreover, in the following description, the expressions "front", "rear", "upper", "lower", "inside", and "outside" are assumed to represent "front" and "rear" directions along a longitudinal axis of a vehicle, "upper" and "lower" directions along a vertical axis of the vehicle, and "inner" and "outer" directions along a transverse axis of the vehicle unless otherwise specifically stated.

Figure 1:
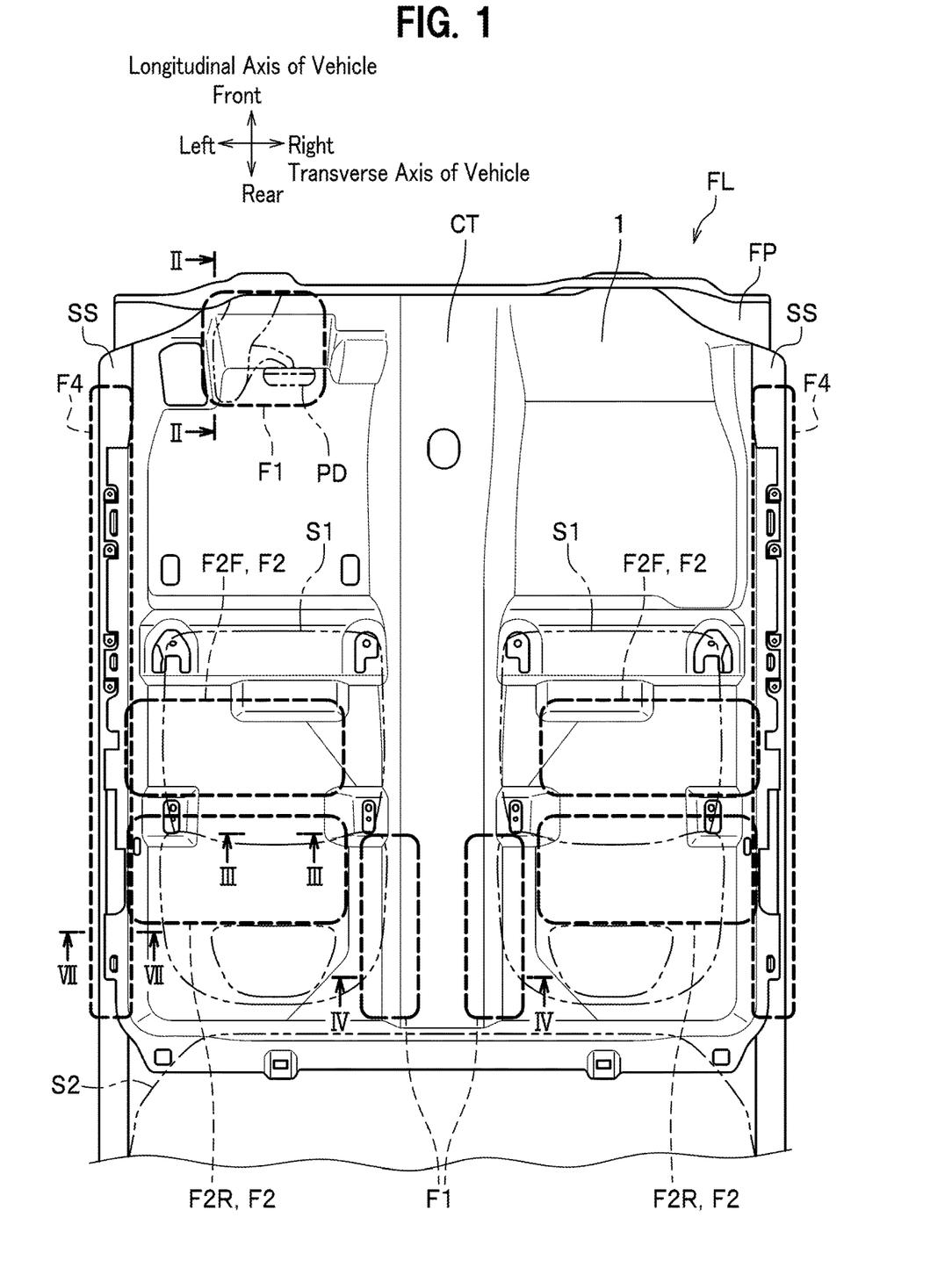
FIG. 1 is a plan view showing a vehicle interior floor surface on which a vehicle floor carpet of an embodiment of the present invention is laid.

The floor carpet 1 of the present embodiment constitutes a vehicle interior floor surface FL and entirely covers a floor panel FP (see FIG. 1).

Meanwhile, the floor carpet 1 is made of a sheet-like member formed in conformity with a shape of the floor panel FP.

The floor carpet 1 includes an insulator 10 and a carpet body (see FIGS. 2 to 7).

The insulator 10 is arranged as a sound insulation material that absorbs and insulates sounds outside a vehicle (see FIGS. 2 to 7).

In addition, the insulator 10 is arranged as a cushioning material for relieving impact when a passenger comes into contact with components of the vehicle interior floor surface FL.

The insulator 10 is disposed on a plate surface of the floor panel FP that constitutes the vehicle interior floor surface FL.

In other words, the insulator 10 is disposed between the vehicle interior floor surface FL and the carpet body 20.

The insulator 10 is formed from a non-woven sheet in a felt form obtained by stacking cotton-like fibers at a predetermined density and in a predetermined thickness.

Here, the insulator 10 is provided separately from the carpet body 20.

Moreover, the insulator 10 includes a base portion 11 and a compressive portion 12.

The base portion 11 is a region in the felt form that undergoes minimal press molding in order to form the shape of the insulator 10 (see FIGS. 2 to 7).

In this way, the base portion 11 is provided with flexibility and irregularity absorbency.

Moreover, the base portion 11 is provided with the flexibility and is thereby laid on the floor panel FP while being curved or bent in such a way as to trace the shape of the floor panel FP.

Meanwhile, the base portion 11 is provided with the irregularity absorbency and is therefore capable of absorbing small irregularities such as joints of members constituting the floor panel FP just by laying the base portion 11 on the floor panel FP.

Moreover, since the base portion 11 is provided with the irregularity absorbency, a region of the base portion 11 to support a wire harness (not shown) sags when the wire harness that causes the irregularity is disposed on the floor panel FP.

Moreover, a surface of the insulator 10 is covered with the carpet body 20, so that a passenger can feel the floor surface like a flat surface without any irregularities.

The compressive portion 12 is a supporting structure to prevent a space formed between the carpet body 20 and the floor panel FP from being crushed and to prevent the carpet body 20 from sinking (see FIGS. 2 to 7).

The compressive portion 12 is formed into a convex shape by subjecting a predetermined portion of the felt-like fabric to a press molding process (a compression process), and the convex portion is hollow.

Moreover, the compressive portion 12 is hardened by the compression process and is increased in rigidity.

In the meantime, the compressive portion 12 is set to such hardness that allows a passenger to feel bounciness of the carpet without giving baggy impression (bagginess) when the passenger steps on the compressive portion 12 or touches the compressive portion 12 with the toe.

In other words, hardness and strength factors of the compressive portion 12 are not set enough for fully supporting the body weight when the passenger steps on the compressive portion 12 for getting on the vehicle.

Here, the hardness and strength factors required for the compressive portion 12 vary depending on the position for the settings. Accordingly, compression rates of the compressive portion 12 are appropriately set depending on the positions for the settings.

The compressive portions 12 are formed at a front seat footrest portion F1, rear seat footrest portions F2, tunnel side surface portions F3, and side sill side surface portions F4 in the insulator 10.

Figure 2:
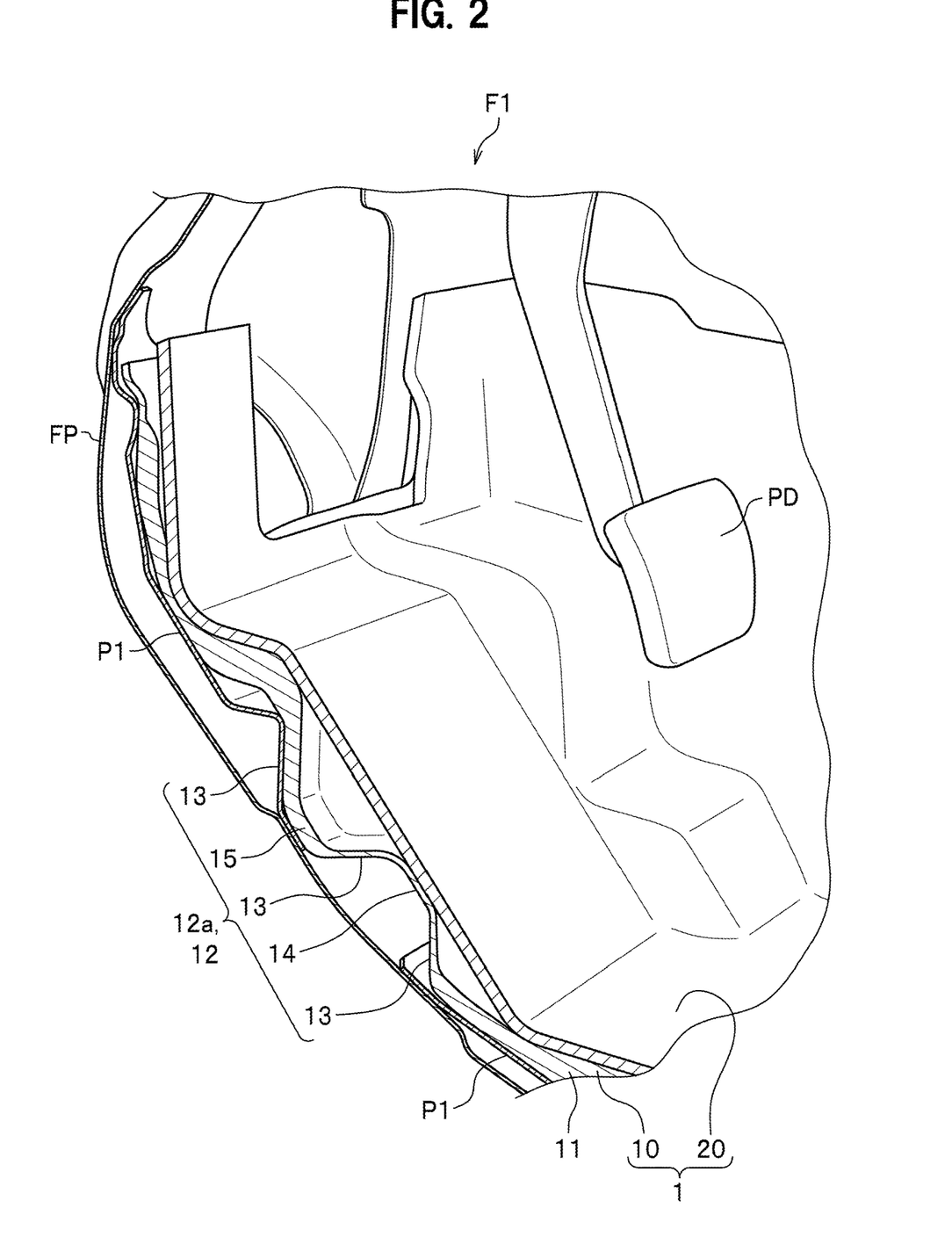
FIG. 2 is a perspective view showing a cross-section taken along II-II line in FIG. 1.

The front seat footrest portion F1 is a place for allowing a driver seated on a driver's seat to put the feet on, which is mainly located on the back side of pedals such as a brake pedal PD (see FIG. 2).

Various reinforcement members P1 are disposed at a portion of the floor panel FP corresponding to the front seat footrest portion F1 in order to protect the feet of the passenger in case of a front collision of the vehicle, and the like.

Meanwhile, various members are arranged on the driver's seat side for the purpose of reinforcement since the pedals such as the brake pedal PD are disposed.

For this reason, various irregularities are formed at the front seat footrest portion of the floor panel FP.

On the other hand, a surface of the carpet body 20 is required to be flat.

As a consequence, unnecessary spaces are formed between the floor panel FP and the carpet body 20.

Then, when the driver steps on a location where one of the spaces is formed or touches this location with the toe and the space is crushed by this action, the crushed space will give baggy impression (bagginess) to the passenger, thereby significantly deteriorating the product value.

Given the circumstances, a front seat footrest convex portion 12a is set to the insulator 10 in order to suppress the occurrence of bagginess by supporting the space having such a size that cannot be fully absorbed by the irregularity absorbency provided to the base portion 11.

The front seat footrest convex portion 12a is formed from a hollow projection having a substantially quadrangular prism shape with a cross-section of a substantially trapezoidal shape in side view (see FIG. 2).

Note that the front seat footrest convex portion 12a is also set to a front passenger's seat side as with the driver's seat side.

The rear seat footrest portion F2 is located below a seating face S1 of a front seat (see FIG. 3).

Here, a region where a passenger seated on a rear seat S2 puts the feet will be referred to as a seating face rear portion F2R, and a region where the passenger seated on the rear seat puts the feet when the passenger stretches the legs will be referred to as a seating face front portion F2F.

An air-conditioning duct (not shown) for the rear seat is installed at the rear seat footrest portion F2 in addition to the reinforcement members (not shown).

As described above, various irregularities are formed at the rear seat footrest portion of the floor panel FP, and unnecessary spaces are therefore formed between the floor panel FP and the carpet body 20.

Given the circumstances, a rear seat footrest convex portion 12b is set to the insulator 10 in order to suppress the occurrence of bagginess by supporting the space having such a size that cannot be fully absorbed by the irregularity absorbency provided to the base portion 11.

Figure 3:
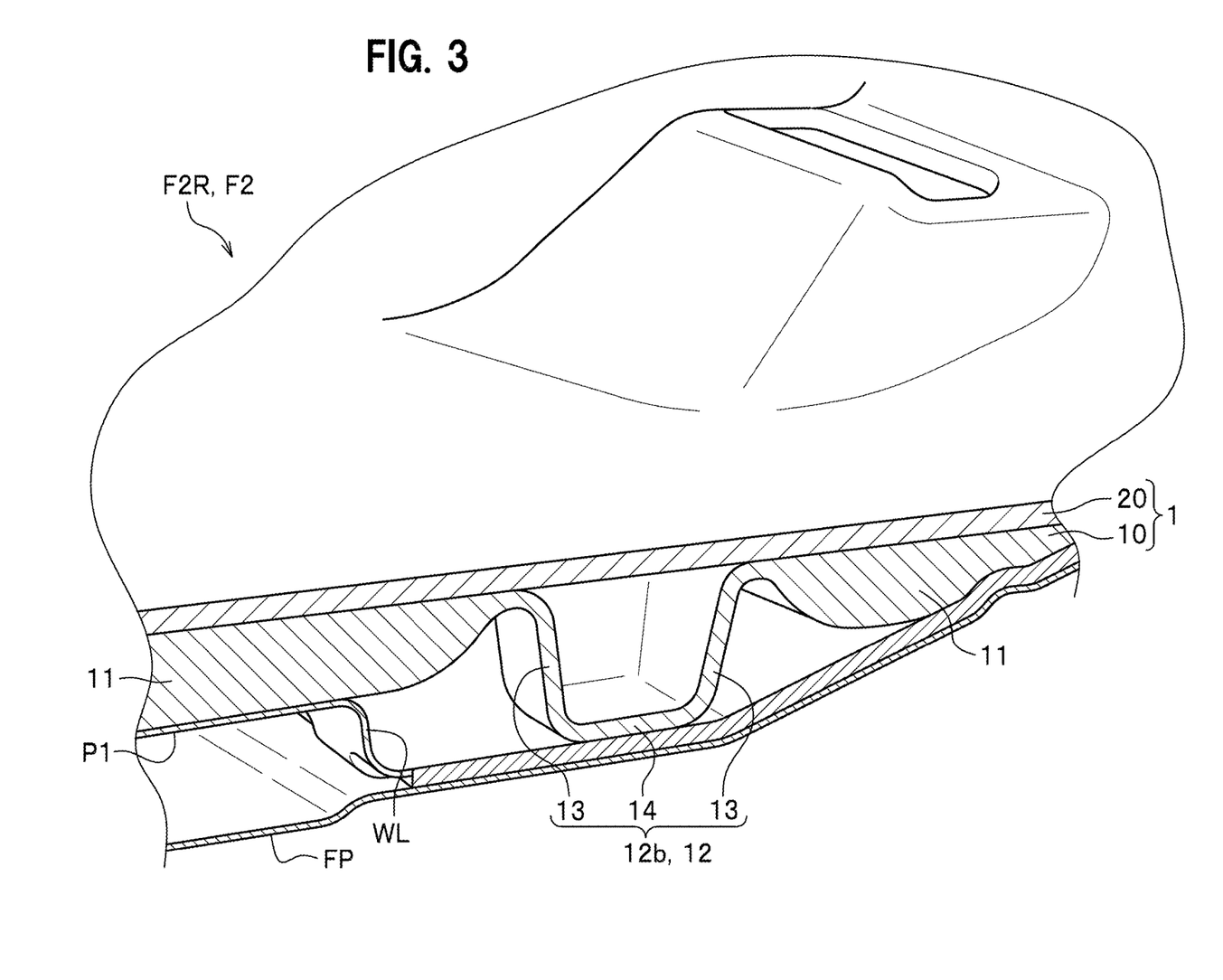
FIG. 3 is a perspective view showing a cross-section taken along III-III line in FIG. 1.

The rear seat footrest convex portion 12b is formed from a hollow projection having a substantially quadrangular prism shape with a cross-section of a substantially trapezoidal shape in rear view (see FIG. 3).

Figure 4:
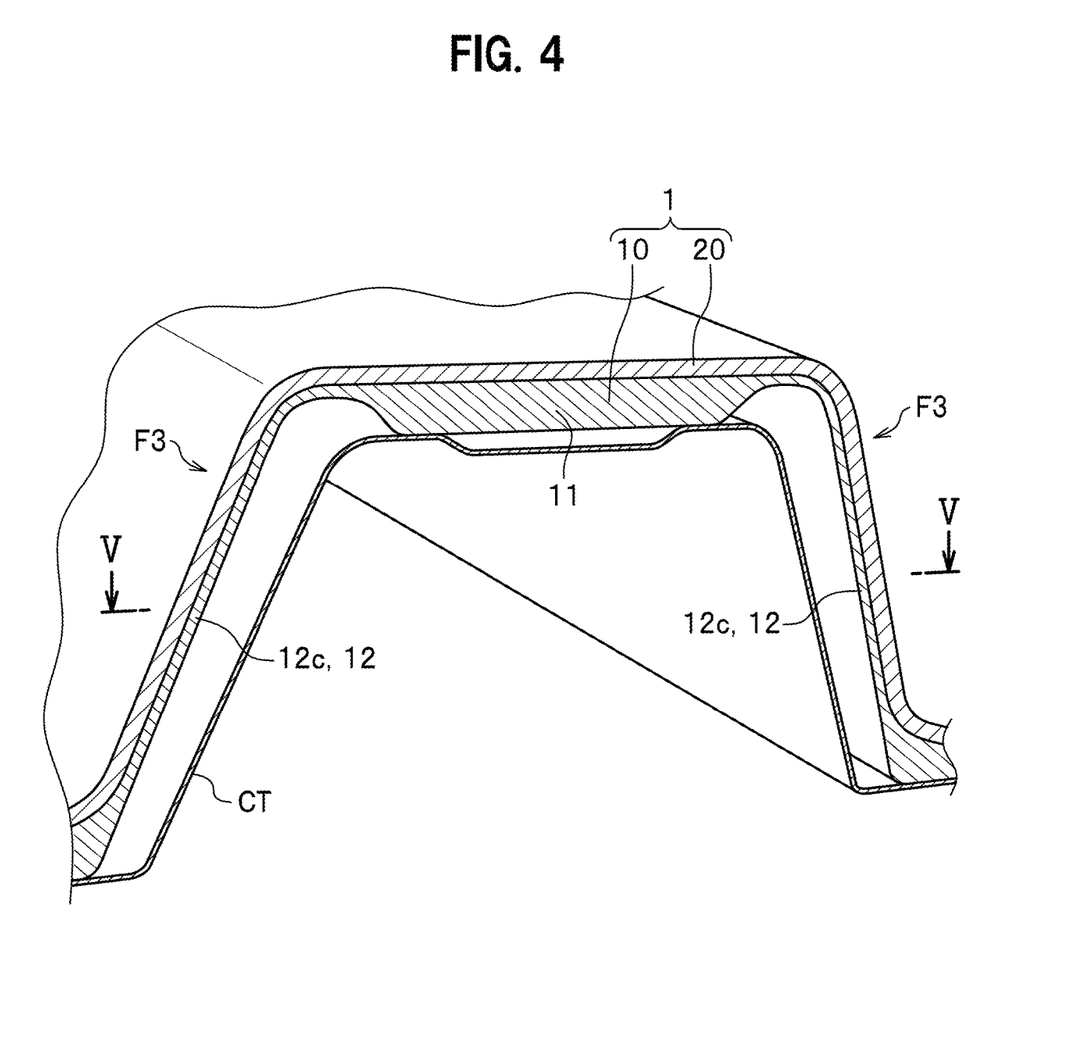
FIG. 4 is a perspective view showing a cross-section taken along IV-IV line in FIG. 1.
Figure 5:
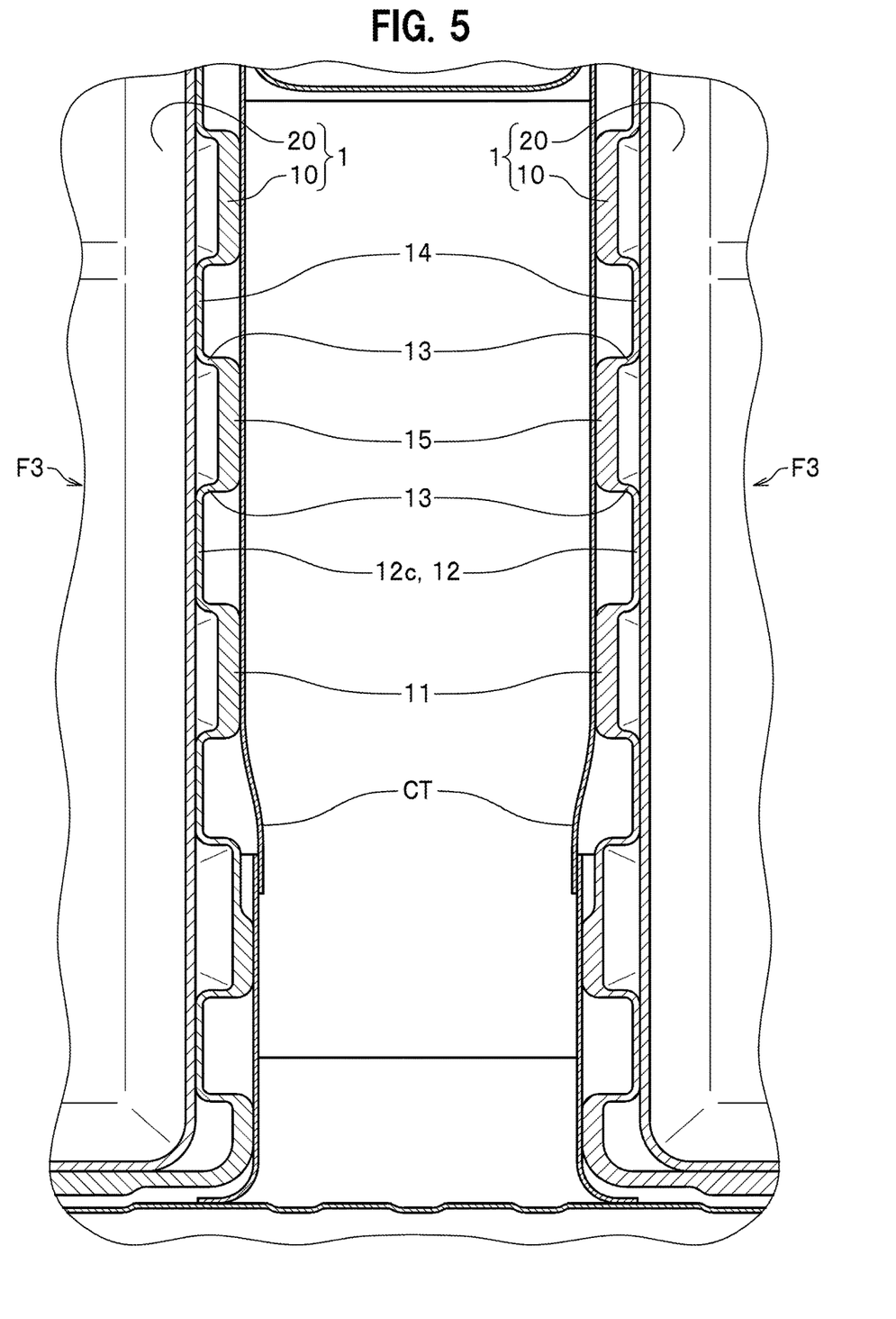
FIG. 5 is a cross-sectional view taken along the V-V line in FIG. 4.
Figure 6:
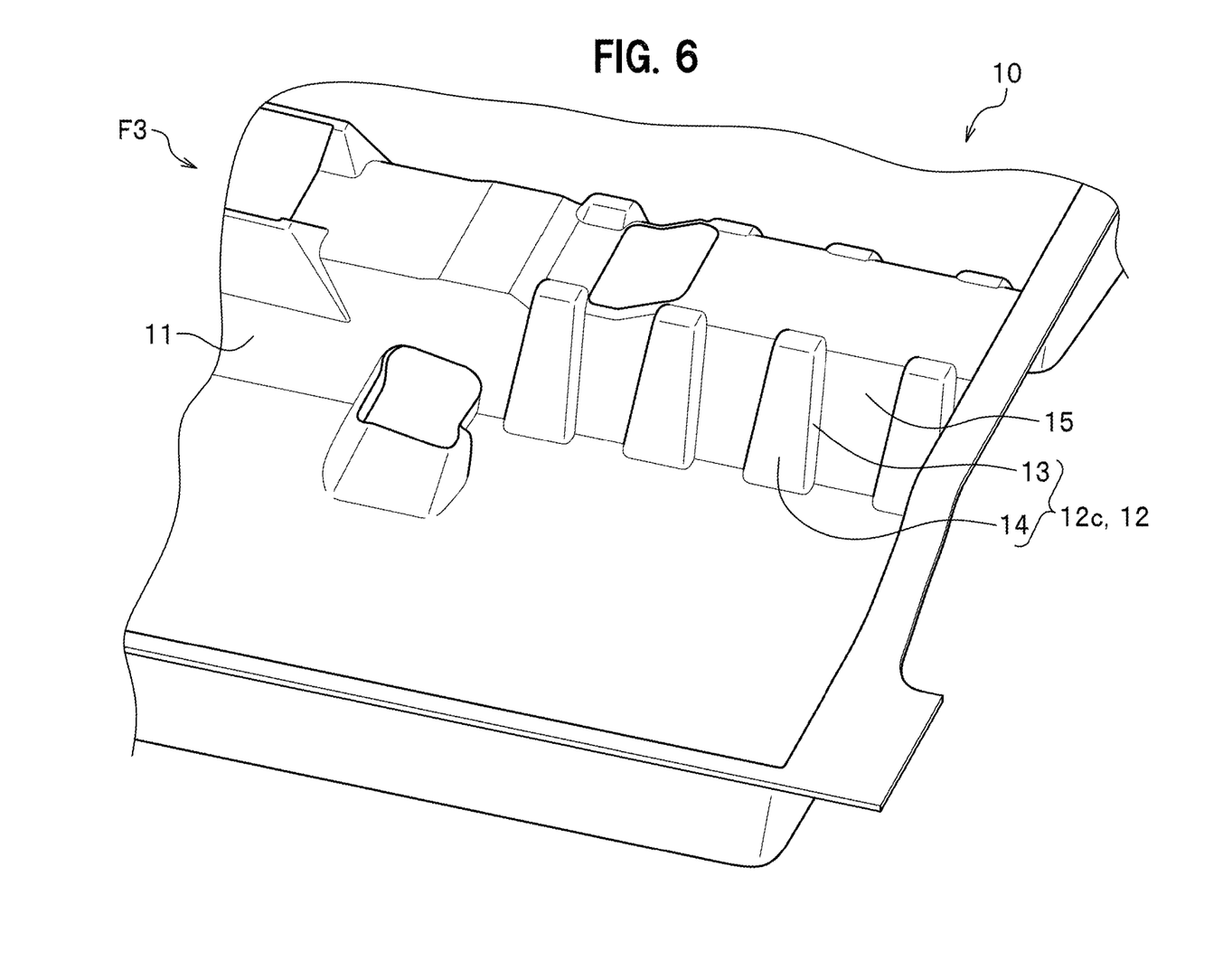
FIG. 6 is a perspective view showing an insulator at a portion VI in FIG. 1.

The tunnel side surface portions F3 are located at rear side surfaces of a center tunnel CT (see FIGS. 4 to 6).

The center tunnel CT is a projection having a cross-section substantially in a trapezoidal shape in vehicle rear view, which extends along the longitudinal axis of the vehicle at the center of the transverse axis of the vehicle and projects into the vehicle interior.

Moreover, tunnel side surface convex portions 12c are set to the insulator 10 in order to suppress the occurrence of bagginess when the foot and the like of the passenger comes into contact with any of the tunnel side surface portions F3.

Each tunnel side surface convex portion 12c is formed from a hollow projection having a substantially quadrangular prism shape with a cross-section of a substantially trapezoidal shape in plan view (see FIGS. 4 to 6).

Each side sill side surface portion F4 is set to a side surface on the vehicle interior side of a side sill SS constituting the framework of the vehicle.

Moreover, the side sill side surface portion F4 constitutes a side edge portion of the vehicle interior floor surface FL.

Meanwhile, the floor carpet 1 is fixed to an upper face of the side sill SS.

In addition, side sill side surface convex portions 12d are set to the insulator 10 in order to suppress the occurrence of bagginess when the foot or the like of the passenger comes into contact with any of the side sill side surface portions F4.

Figure 7:
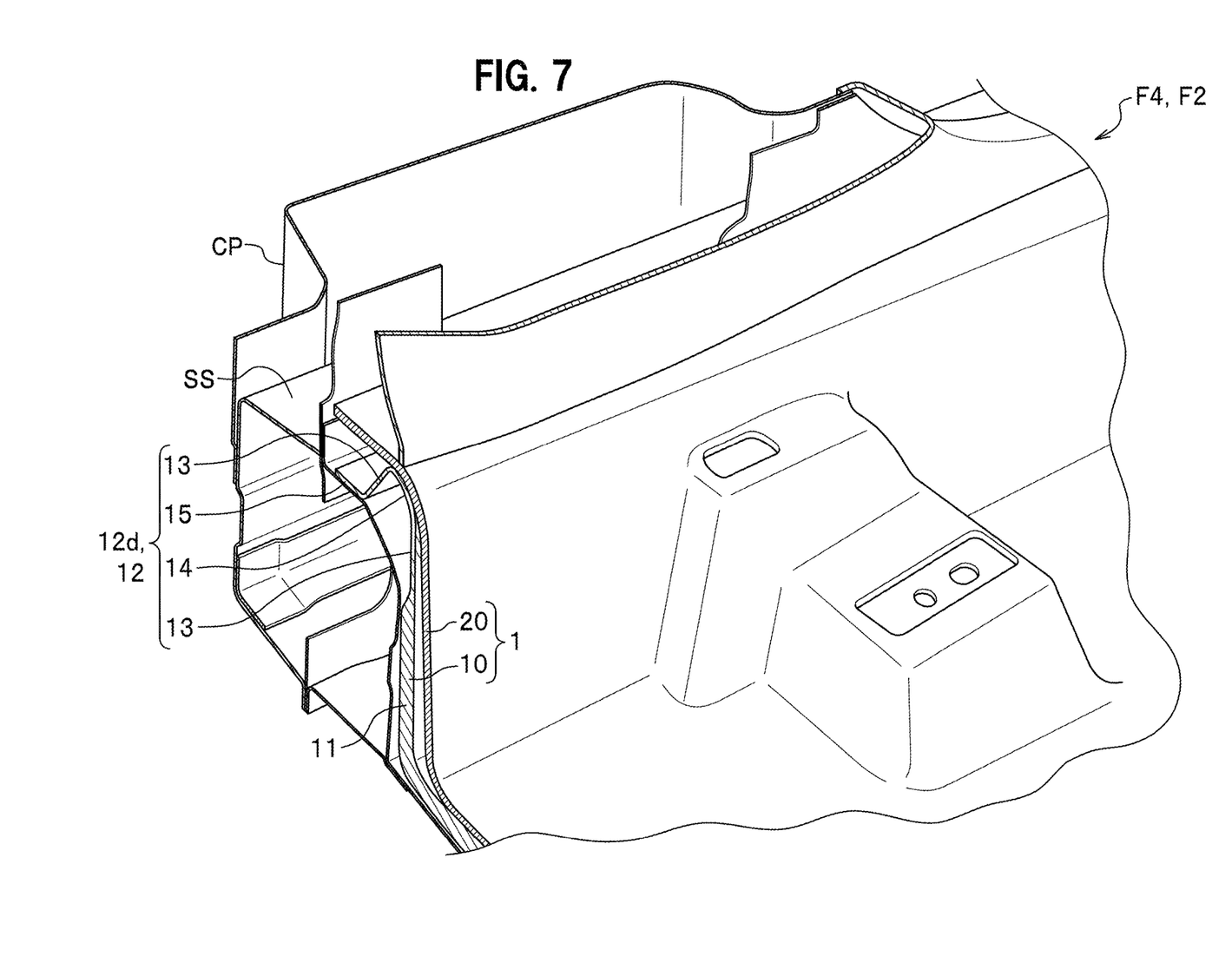
FIG. 7 is a perspective view showing a cross-section taken along the VII-VII line in FIG. 1.
Figure 8:
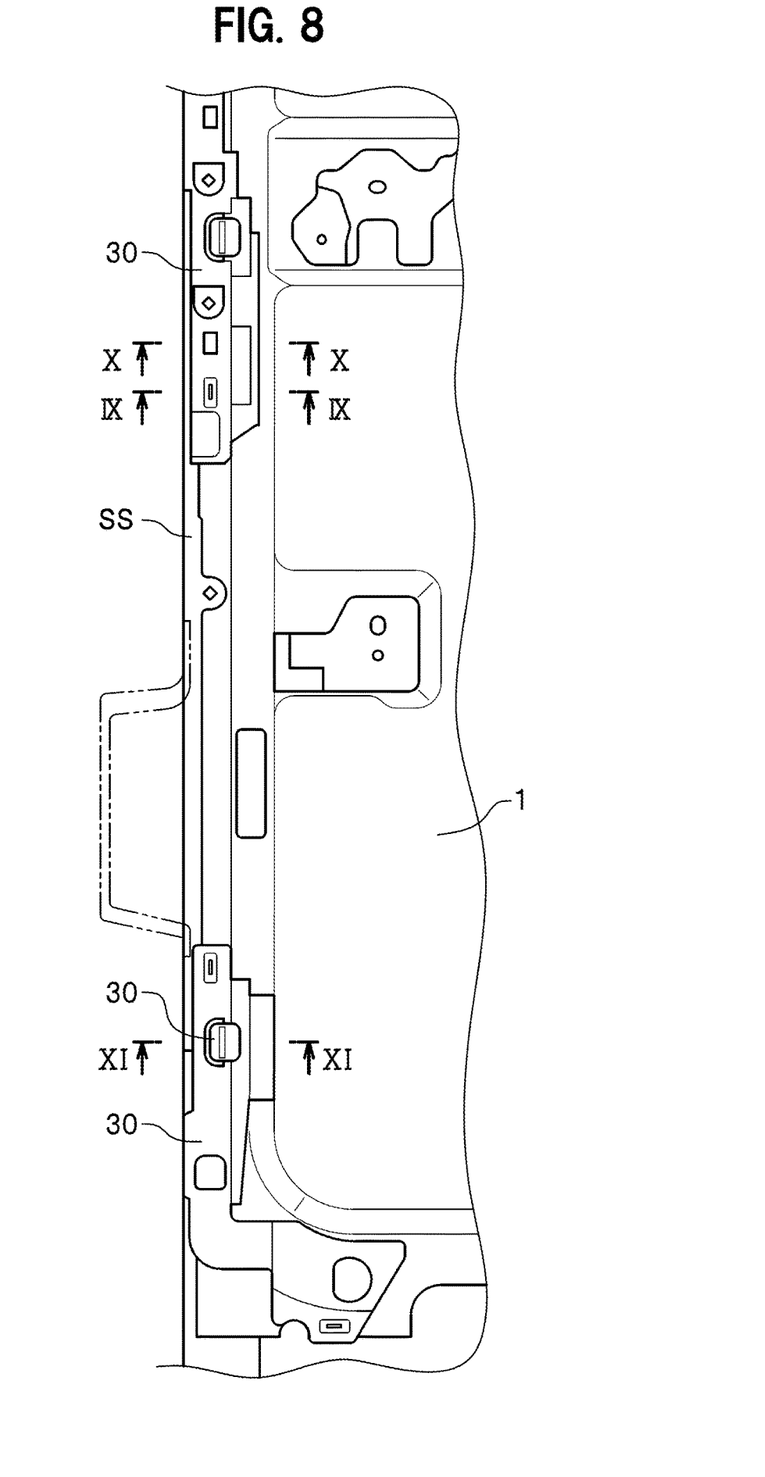
FIG. 8 is a plan view showing the insulator at a portion F4 in FIG. 1.

Each side sill side surface convex portion 12d is formed from a hollow projection having a substantially quadrangular prism shape with a cross-section of a substantially trapezoidal shape in rear view (see FIG. 7).

The convex shape of each of the convex portions (the front seat footrest convex portions 12a, the rear seat footrest convex portions 12b, the tunnel side surface convex portions 12c, and the side sill side surface convex portions 12d) constituting the compressive portions 12 is formed from load-bearing walls 13, tip side receiving faces 14, and base side receiving faces 15.

Each load-bearing wall 13 is a structure located between the floor panel FP and the carpet body 20 and configured to withstand a load to be applied to carpet body 20 (see FIGS. 2 to 7).

The load-bearing wall 13 is set to have the compression rate and hardness greater than those of the tip side receiving face 14 and the base side receiving face 15.

The load-bearing walls 13 are disposed such that intervals with wall surfaces WL constituting recesses in the floor panel FP and with the adjacent load-bearing walls 13 become substantially equal intervals (see FIGS. 3 and 5).

Here, the load-bearing walls 13 are disposed at smaller intervals at a location where the toes of the passengers come into contact frequently, a location where the load is applied frequently, and so forth.

Here, the compression rates, the intervals, and the like of the load-bearing walls 13 are appropriately set depending on the materials such as the non-woven sheet in the felt form used for the insulator 10.

Each tip side receiving face 14 constitutes a tip portion of the convex shape formed by the press molding process (see FIGS. 2 to 7).

The tip side receiving face 14 is formed to as to fill a front end portion of the load-bearing wall 13 formed into a tubular shape.

The compression rate of the tip side receiving face 14 is set equal to the compression rate of the load-bearing wall 13.

At the front seat footrest portion F1, the tunnel side surface portion F3, and the side sill side surface portion F4, the tip side receiving face 14 is in contact with a back surface of the carpet body 20.

Meanwhile, at the rear seat footrest portion F2, the tip side receiving face 14 is in contact with a surface of the floor panel FP.

Each base side receiving face 15 is a region to connect adjacent convex shapes to each other when two or more convex shapes are formed (see FIGS. 2 to 7).

The compression rate of the base side receiving face 15 is set lower than that of the tip side receiving face 14.

At the front seat footrest portion F1, the tunnel side surface portion F3, and the side sill side surface portion F4, the base side receiving face 15 is in contact with the surface of the floor panel FP.

Meanwhile, at the rear seat footrest portion F2, the base side receiving face 15 is in contact with the back surface of the carpet body 20.

Here, the insulator 10 configured as described above is fixed to the side sill SS by using hook bodies 30 and clips 40 (see FIGS. 8 to 11).

Figure 9:
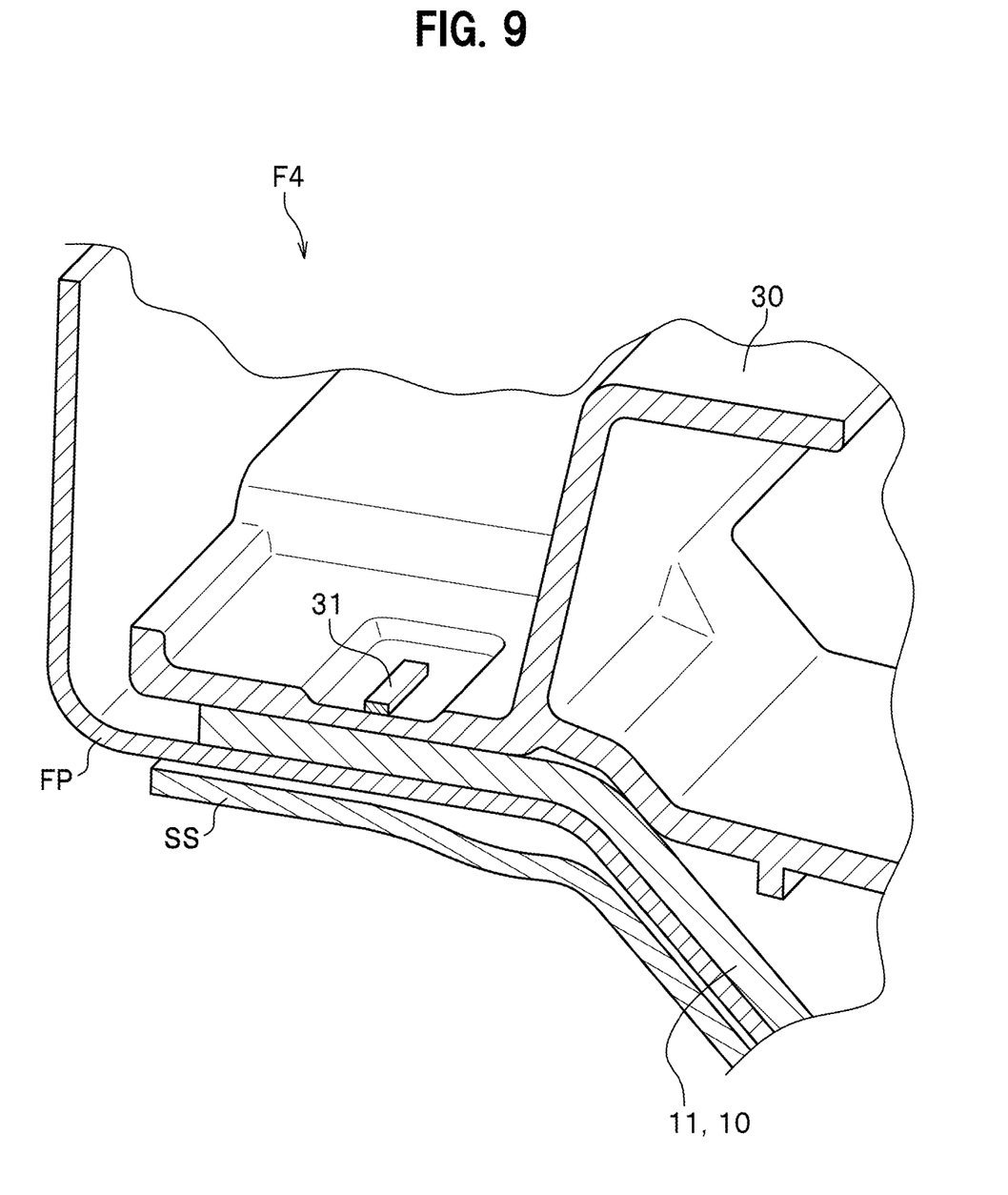
FIG. 9 is a perspective view showing a cross-section taken along the IX-IX line in FIG. 8.
Figure 10:
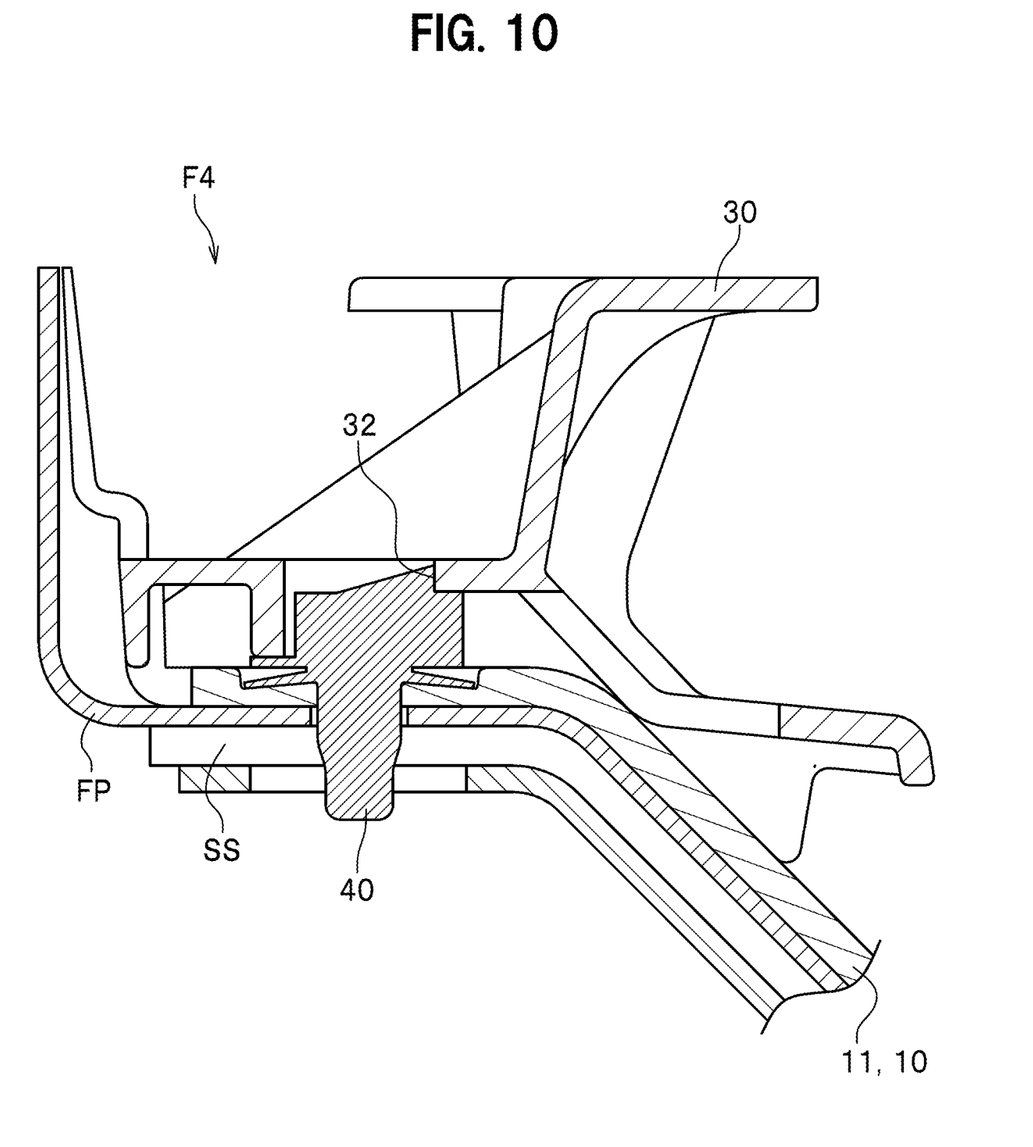
FIG. 10 is a cross-sectional view taken along the X-X line in FIG. 8.
Figure 11:
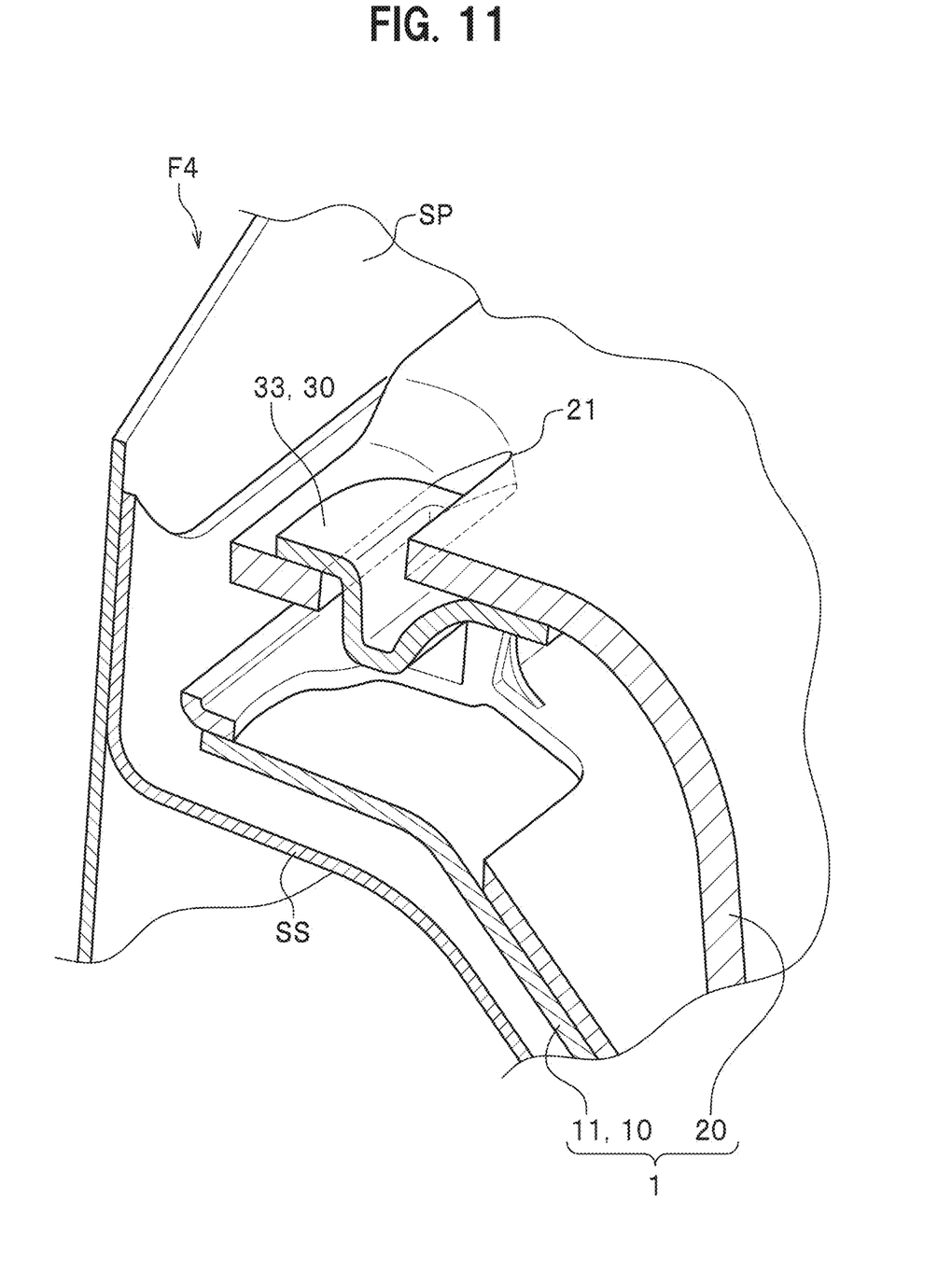
FIG. 11 is a perspective view showing a cross-section taken along the XI-XI line in FIG. 8.

Each hook body 30 is made of a resin material which is elongate in the front-rear direction and is formed by injection molding (see FIG. 9 to 11).

The hook body 30 is bundled together with the insulator 10 by using a staple 31.

The hook body 30 includes a fixation hole 32 and a tongue piece 33, which are located at different regions from a position of fixation with the staple 31.

The fixation hole 32 is a through hole to insert the clip 40.

The tongue piece 33 is a cantilever segment extending from the inner side to the outer side in the vehicle width direction.

The tongue piece 33 is configured to fix the laid carpet body 20.

The carpet body 20 is fixed by hooking a locking hole 21, which is formed at a side edge portion of the carpet body 20 as an incision extending along the side edge, from the outer side of in the vehicle width direction on the tongue piece 33.

The clip 40 is fixed to the side sill SS while penetrating the fixation hole 32, thereby fixing the side edge portion of the insulator 10 to an upper surface of the side sill SS (see FIG. 10).

The above-described fixation structures of the insulator 10 each formed from the hook body 30 and the clip 40 are arranged at multiple positions at peripheral portions of the floor carpet 1.

Next, the carpet body 20 will be described.

The carpet body 20 constitutes a superficial layer portion of the floor carpet 1 (see FIGS. 2 to 7).

Moreover, the carpet body 20 decorates the vehicle interior floor surface FL and improves the design of the vehicle interior.

The carpet body 20 is stacked on the surface of the insulator 10.

The carpet body 20 is formed from a fabric obtained by weaving threads into a base cloth in a looped fashion.

Meanwhile, the side edge portion of the carpet body 20 is provided with the multiple locking holes 21.

Each locking hole 21 is formed from a hole that penetrates the carpet body 20 (see FIG. 11).

The locking hole 21 is set to such a position that allows the side edge of the carpet body 20 to come into contact with a side surface panel SP of the vehicle body in the state where the locking hole 21 is hooked on the tongue piece 33 while allowing penetration of the tongue piece 33 therethrough.

Then, the carpet body 20 is fixed onto the vehicle interior floor surface FL by hooking the respective locking holes 21 on the corresponding tongue pieces 33.

<Installation Procedures>

Next, a description will be given of procedures to lay the floor carpet 1 on the floor panel FP.

Here, each hook body 30 is fixed to a predetermined position of the side edge portion of the insulator in advance by using the staple 31. Meanwhile, the clip 40 is assembled with the hook body 30 in advance.

The insulator 10 assembled with the hook bodies 30 and the clips 40 as described above is spread over the floor panel FP.

Next, the position of the insulator 10 is adjusted in such a way as to locate the compressive portions 12 of the insulator 10 at the given recesses on the floor panel FP.

Then, the clips 40 are inserted into the side sill SS, thereby fixing the insulator 10 and the hook bodies 30 to the side sill SS.

Next, components such as the wire harness (not shown) are disposed at prescribed positions on the insulator 10.

Subsequently, the carpet body 20 is spread over the insulator 10.

Then, the position of the carpet body 20 is adjusted such that the side edge of the carpet body 20 comes into contact with an inner surface of the side surface panel SP.

The installation of the floor carpet 1 is completed after hooking the locking holes 21 on the tongue pieces 33.

Next, operations and effects of the present embodiment will be described.

According to the floor carpet 1 of the present embodiment, the load-bearing wall 13 formed by subjecting the insulator 10 to the compression process supports the space between the floor panel FP and the carpet body 20.

In this way, the sinking of the carpet body 20 is suppressed when the passenger stepped on the carpet body 20, whereby the bagginess is eliminated and the product value is improved.

Meanwhile, according to the floor carpet 1 of the present embodiment, the load-bearing wall 13 supports the space between the floor panel FP and the carpet body 20 located at the footrest portion near the driver's seat.

The driver does not often put the feet on the place on the back side of the pedals such as the brake pedal PD while driving. Nonetheless, the driver may possibly put the feet thereon when the driver is not driving as in a parking state.

Even in the above-mentioned place, it is possible to suppress the occurrence of the bagginess of the vehicle interior floor surface FL when the driver puts the feet thereon, and thus to improve the product value.

Meanwhile, according to the floor carpet 1 of the present embodiment, the load-bearing wall 13 supports the space between the floor panel FP and the carpet body 20 at the footrest portion for the rear seat, which is located below the seating face of the front seat.

In this way, it is possible to suppress the occurrence of the bagginess and to improve the product value even when the passenger on the rear seat stretches the legs and steps on the place below the seating face of the front seat for a moment.

In the meantime, according to the floor carpet 1 of the present embodiment, the load-bearing wall 13 supports the space between the center tunnel side surface portion F3 and the carpet body 20.

In this way, the occurrence of the bagginess is suppressed when the passenger on the rear seat touches the center tunnel side surface portion F3 with the toe, and it is therefore possible to improve the product value.

Meanwhile, according to the floor carpet 1 of the present embodiment, the load-bearing wall 13 supports the space between the floor panel FP and the carpet body 20, which is located on an inner side surface on an inner side of the side sill SS.

In this way, the occurrence of the bagginess is suppressed when the passenger on the rear seat touches the center tunnel side surface portion F3 with the toe, and it is therefore possible to improve the product value.

In the meantime, according to the floor carpet 1 of the present embodiment, the carpet body 20 extends along the transverse axis of the vehicle to an edge of the carpet body 20, and the edge of the carpet body 20 is in contact with the side surface panel SP of the vehicle body.

In this way, even when a side portion of the carpet body 20 is pushed, the end portion of the carpet body 20 in contact with the side surface panel SP of the vehicle body can suppress the occurrence of the bagginess.

It is understood that the foregoing description is that of the preferred embodiments of the invention and that various changes and modifications may be made thereto without departing from the spirit and scope of the invention as defined in the appended claims.

What is claimed is:

1. A vehicle floor carpet comprising:
   an insulator comprising a non-woven sheet;
   a carpet body disposed on and covering an upper surface of the insulator;
   a load-bearing wall which is a compressed portion of the insulator and which extends between a floor panel and the carpet body and supports the floor panel and the carpet body and preserves a space between the floor panel and the carpet body;
   a tip side receiving face that joins a front end portion of the load-bearing wall formed in a tubular shape and that forms a tip part of a convex shape; and
   a base side receiving face being in contact with a surface of the floor panel and joining neighboring portions that are each formed in the convex shape,
   wherein the base side receiving face has a compression rate that is set lower than a compression rate of the tip side receiving face.

2. The vehicle floor carpet according to claim 1, wherein a portion of the floor panel and a portion of the carpet body are located at a footrest which is associated with a driver's seat and have a space therebetween, and
   wherein the load-bearing wall supports the portion of the floor panel and the portion of the carpet body and preserves the space.

3. The vehicle floor carpet according to claim 1, wherein a portion of the floor panel and a portion of the carpet body are located below a seating face of a front seat and have a space therebetween, and
   wherein the load-bearing wall supports the portion of the floor panel and the portion of the carpet body and preserves the space.

4. A vehicle floor carpet comprising:
   an insulator comprising a non-woven sheet;
   a carpet body disposed on and covering an upper surface of the insulator; and
   a load-bearing wall which is a compressed portion of the insulator and which extends between a floor panel and the carpet body and supports the floor panel and the carpet body and preserves a space between the floor panel and the carpet body,
   wherein a side surface of a center tunnel and a portion of the carpet body are located at a footrest associated with a rear seat and have a space therebetween, and
   wherein the load-bearing wall supports the side surface of the center tunnel and the portion of the carpet body and preserves the space.

5. A vehicle floor carpet, comprising:
   an insulator comprising a non-woven sheet;
   a carpet body disposed on and covering an upper surface of the insulator; and
   a load-bearing wall which is a compressed portion of the insulator and which extends between a floor panel and the carpet body and supports the floor panel and the carpet body and preserves a space between the floor panel and the carpet body,
   wherein an inner side surface of a side sill and the carpet body have a space therebetween, and
   wherein the load-bearing wall supports the inner side surface of the side sill and the carpet body and preserves the space.

6. A vehicle floor carpet comprising:
an insulator comprising a non-woven sheet;
a carpet body disposed on and covering an upper surface of the insulator; and
a load-bearing wall which is a compressed portion of the insulator and which extends between a floor panel and the carpet body and supports the floor panel and the carpet body and preserves a space between the floor panel and the carpet body,
wherein the carpet body includes a side edge portion having a locking hole therethrough,
wherein the carpet body extends along a transverse axis of a vehicle to an edge of the carpet body,
wherein the edge of the carpet body is in contact with a side surface panel of a vehicle body, and
wherein the carpet body is disposed over the floor panel by a tongue piece of the vehicle body, the tongue piece being hooked on the carpet body through the locking hole.

* * * * *